United States Patent

Rehm et al.

[11] Patent Number: 6,076,568
[45] Date of Patent: Jun. 20, 2000

[54] METHOD FOR INERTING A GENERATOR IN A POWER STATION

[75] Inventors: Helmut Rehm, Oberhausen; Klaus Weller, Voerde; Christoph Lehmann, Neukirchen-Vluyn, all of Germany

[73] Assignee: Siemens Aktiengesellschaft, Munich, Germany

[21] Appl. No.: 09/268,272

[22] Filed: Mar. 15, 1999

Related U.S. Application Data

[63] Continuation of application No. PCT/DE97/01892, Aug. 29, 1997.

[30] Foreign Application Priority Data

Sep. 13, 1996 [DE] Germany .......................... 196 37 420
Sep. 13, 1996 [DE] Germany .......................... 196 37 422

[51] Int. Cl.$^7$ ...................................................... B65B 1/04
[52] U.S. Cl. ................................................ 141/98; 141/66
[58] Field of Search ................................ 141/98, 65, 66, 141/1, 64

[56] References Cited

U.S. PATENT DOCUMENTS 5,139,055  8/1992  Pollard ........................................ 141/1

FOREIGN PATENT DOCUMENTS

43/2764          1/1943   Germany .
1 488 079        4/1969   Germany .
295 19 578 U1    3/1996   Germany .

OTHER PUBLICATIONS

Patent Abstracts of Japan No. 01–099452 (Yasushito), dated Apr. 18, 1989.
Patent Abstract of Japan No. 58–009548 (Tadashi), dated Jan. 19, 1983.

*Primary Examiner*—Steven O. Douglas
*Attorney, Agent, or Firm*—Herbert L. Lerner; Laurence A. Greenberg; Werner H. Stemer

[57] ABSTRACT

A method for inerting a generator in a power station includes flushing the generator in a rapid manner which is favorable in terms of power consumption and is simplified in terms of process technology. Cooling gas which is present in the working state for cooling in the generator is displaced through the use of an inert gas stored in gaseous form, in particular argon. A phase transition from, for example, a liquid to a gaseous inert gas, which prolongs the inerting operation and consumes large amounts of power, can thus be dispensed with. The supply of inert gas can easily be monitored by pressure measurement.

25 Claims, 2 Drawing Sheets

METHOD FOR INERTING A GENERATOR IN A POWER STATION

CROSS-REFERENCE TO RELATED APPLICATION

This application is a continuation of copending International Application No. PCT/DE97/01892, filed Aug. 29, 1997, which designated the United States.

BACKGROUND OF THE INVENTION

Field of the Invention

The invention relates to a method for inerting a power-producing generator in a power station, in particular a hydrogen-cooled generator.

During operation, generators above a specific rated power are usually cooled through the use of a gaseous coolant. Hydrogen ($H_2$) has generally proven suitable for that purpose, since it has a lower density, a better thermal conductivity and a higher specific heat than air. Furthermore, the heat capacity of hydrogen can be increased by raising the gas pressure in comparison with air without producing undesirably high gas friction losses in the generator. The gas pressure is therefore generally kept at a level of 3 to 6 bar. The hydrogen is circulated inside a closed cooling circuit of the generator, for example through the use of a multi-stage axial blower.

In order to provide maintenance work which is occasionally required on the generator, or in the event of an emergency, it is necessary to flush or empty the generator and then refill it. In order to avoid highly explosive hydrogen-air mixtures, it is prescribed in absolute terms for those exchange operations (DIN VDE 0530, Part 3) that the generator is to be flushed with an interim or inert gas. In order to do that, in practice carbon dioxide ($CO_2$) has heretofore been used as the inert gas, as can be seen from the paper entitled "Empfehlungen zur Verbesserung der $H_2$—Sicherheit wasserstoffgekühlter Generatoren" [Recommendations on Improving the $H_2$-Safety of Hydrogen-Cooled Generators] 1$^{st}$ edition 1989, of the "Generators and Motors" working committee of the "Vereinigung Deutscher Elektrizitätswerke" [Association of German Electric Generating Plants]—VDEW, and from the above-mentioned VDE standard.

Patent Abstracts of Japan Publication No. 01 099 452 describes a hydrogen-blow-off device for a generator. A blow-off line for the hydrogen is flushed with argon before the hydrogen is blown-off in order to remove air from the blow-off line. The hydrogen is then removed from the generator through the blow-off line. Since there is no more oxygen in the blow-off line, the hazard of explosion by an oxyhydrogen gas reaction in the blow-off line is eliminated.

Patent Abstracts of Japan Publication No. 58 009 548 describes a device for cooling an electrical rotary machine. A hydrogen tank, an inert gas tank and a pressurized air tank are respectively connected with the rotary machine. U-shaped line segments are provided, which are respectively connected to the feed lines of the three tanks. During operation of the rotary machine the respective line segments for the inert gas tank and for the pressurized air tank are removed and the lines are protected with blind flanges. When the rotary machine is inspected only the U-shaped line segment of the hydrogen tank is removed. An increase in operating safety for operation and maintenance of the rotary machine is achieved through the use of the flange-mountable and dismountable U-shaped line segments.

Filling a hydrogen-cooled generator and prior flushing with $CO_2$ is likewise described in German Utility Model DE 295 19 578 U1, in German Published, Prosecuted Patent Application DE-S 3644 VIII d/21d1 of Dec. 7, 1943 and in German Published, Non-Prosecuted Patent Application 1 488 079.

Since $CO_2$ is stored in liquid form in cylinders, a $CO_2$-evaporator is necessary to convert it into the gas phase. The evaporator requires additional space and, under certain circumstances, must in turn be provided with a power supply connection for electrical heating to generate the necessary evaporation heat as well as with an emergency power supply. Safety-oriented monitoring of the current $CO_2$ level can only be realized through the use of a complicated weight measurement of the $CO_2$ cylinders, since due to the strongly temperature-dependent pressure and the likewise temperature-dependent, simultaneous presence of liquid and gas phases, it is not easily possible to work out the level, for example through the use of pressure.

If, after inerting, it is necessary to gain access to the generator for maintenance purposes, the $CO_2$ has to be displaced by air in order to avoid toxic hazards.

During that operation, as well as for the above-described inerting operation, the concentrations of inert gas in hydrogen or inert gas in air are usually monitored through the use of $CO_2/H_2$ concentration measuring devices.

SUMMARY OF THE INVENTION

It is accordingly an object of the invention to provide a method for inerting a generator in a power station, which overcomes the hereinafore-mentioned disadvantages of the heretofore-known methods of this general type, which is simplified, rapid, favorable in terms of power consumption and can be used without additional energy even in hazard situations.

With the foregoing and other objects in view there is provided, in accordance with the invention, in a power station having a generator cooled with a gaseous, pressurized coolant, in particular hydrogen, during normal operation, a method for inerting the generator, which comprises blowing off the coolant by venting; and completing the operation of flushing the generator by displacing the coolant with an inert gas stored in gaseous form and supplied directly to the generator in this state without phase transition.

It is advantageous that this method dispenses with the otherwise customary phase transition of the inert gas from the liquid into the gas phase through the use of an evaporator. Thus the purchase and maintenance costs of the latter are dispensed with, as is the space which usually has to be kept, for the evaporator. Furthermore, it is possible to do without the power supply connection which is required for heating the evaporator and the expense for an emergency power supply. As a result, at the same time the process reliability is increased, since in a possible emergency such connections could be affected. The power consumption for heating the evaporator is saved, considerably relieving the emergency power supply network particularly in the event of emergency power having to be supplied. The time saved by dispensing with the phase transition is to be regarded as a further advantage in safety terms, since the inert gas can be supplied to the generator without delay, for example in the event of an emergency.

In accordance with another mode of the invention, argon (Ar) is used as the inert gas. Sufficient quantities of this noble gas are available in gas form on an industrial scale, and the gas has a virtually identical thermal conductivity and a similar density to $CO_2$ which has been used to date. Thus the gas-concentration measuring devices operating on the principle of thermal conductivity can advantageously continue to be used.

The principle of gas stratification during inerting is likewise maintained, due to the differences in density between coolant and inert gas. Furthermore, meaningful monitoring of the level of the inert-gas storage device is possible through the use of pressure measurement transducers, since the pressure can be used to work out the volume of gas still present with sufficient accuracy. There is no need for expensive monitoring gas of the gas storage device, as is required, for example, for $CO_2$. Furthermore, argon is generally regarded as environmentally friendly. In any case, it forms approximately one per cent by volume of atmospheric air, is non-toxic and is not hazardous to people even at higher concentrations in air, while $CO_2$, which is naturally present in air to the extent of about 0.03 percent by volume, is life-threatening to people at higher concentrations.

In accordance with a further mode of the invention, both a cooling-gas supply system and an inert-gas supply system form part of a gas supply unit associated with the generator. This gas supply unit may have a plurality of stop valves, which may be constructed as controllable solenoid valves.

In accordance with an added mode of the invention, the cooling-gas supply system is coupled to the generator, for example through the use of a feedline and a flushing line, supplies the volume of cooling gas required to fill the generator through the feedline and, during operation, replaces the leakage of cooling gas caused essentially by the liberation of gas. During operation, the volume of cooling gas circulates in a closed cooling circuit within the generator.

In accordance with an additional mode of the invention, a preferred configuration of lines and stop valves permits the excess pressure of the cooling gas to be initially reduced, for inerting purposes, by venting it, through the feedline, into a blow-off line, with the flushing line closed. The inert gas is then fed into the flushing line through at least one solenoid valve, in such a manner that it fills the generator from a location situated geodetically below it.

In accordance with yet another mode of the invention, provision is made for automation of the inerting method through the use of a central process control unit, in which case all of the necessary gas streams can be controlled by preprogrammed opening or closing of the solenoid valves as a function of manual command signals, in the case of maintenance work, and in addition as a function of automatically triggered command signals, in the event of emergencies.

In accordance with yet a further mode of the invention, partial control sequences for the automated filling or emptying can be activated in the central process control unit by manually or automatically triggered command signals. To this end, the valve devices assigned to a cooling-gas supply system, a compressed-air supply system and the valve devices assigned to an inert-gas supply system of a gas supply unit of the generator are constructed to be controllable, electrically actuated solenoid or control valves. After activating one of the two partial control sequences, the gas currently situated in the generator is then displaced by the inert gas from the inert-gas supply system in a preprogrammed and automated sequence by corresponding control of the valve devices. This inert gas is displaced, in the case of the filling partial control sequence, by flushing with cooling gas or, in the case of the emptying partial control sequence, by flushing with air from the compressed-air supply system.

Advantageously, the automated sequence which is linked to logic conditions provides a high level of process safety, since manual incorrect operations are precluded. At the same time, the method can be carried out in a comparatively short time, with little expenditure on personnel, from a control desk in the power station.

In accordance with yet an added mode of the invention, the measurement range of concentration measuring devices assigned to the gas supply unit is switched over by the process control unit and thus these devices are able to operate in a manner suited to the flushing operation currently underway. In so doing, one flushing operation can be terminated and another one started as a function of reaching predetermined concentration values stored in the process control unit.

In accordance with a concomitant mode of the invention, in order to further increase the process safety, it is preferred for automatic emptying of the generator to be initiated in the event of the existence of at least one of a plurality of criteria which signals possible incorrect operation.

Other features which are considered as characteristic for the invention are set forth in the appended claims.

Although the invention is illustrated and described herein as embodied in a method for inerting a generator in a power station, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
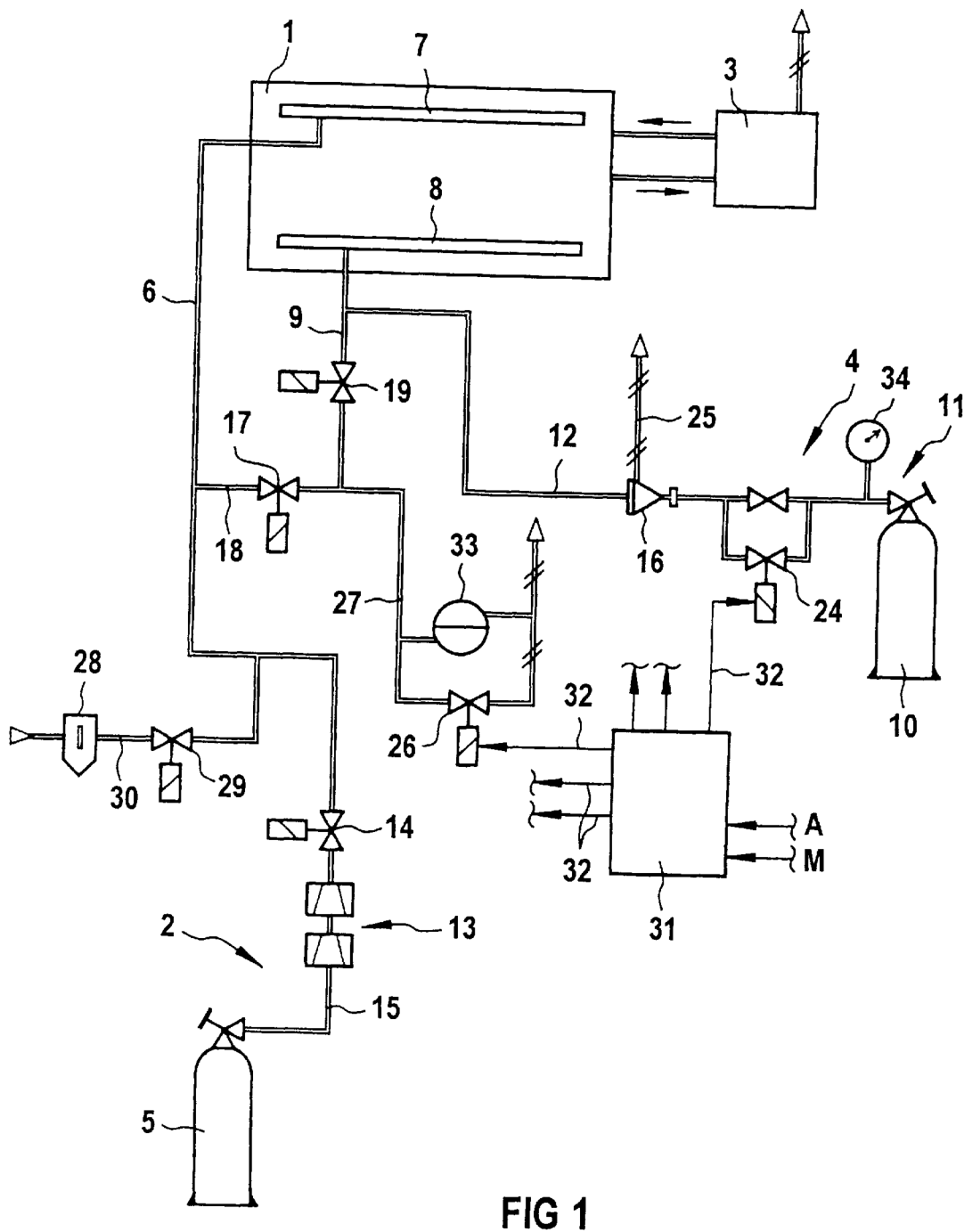
FIGS. 1 and 2 are each very diagrammatic illustrations of a power-producing generator of a non-illustrated power station.

Referring now to the figures of the drawings in detail and first, particularly, to FIG. 1 thereof, there is seen a gas supply unit which is associated with a generator 1 and has, inter alia, a coolant supply system 2, a gas dryer 3 and a flushing-gas or inert-gas supply system 4.

Hydrogen ($H_2$) stored in cylinders 5 is used as a coolant and, upon filling through a feedline 6, is supplied to a geodetically upper distributor pipe 7 of the generator 1. A lower distributor pipe 8 is connected, through a flushing line 9 and a stop valve 19 which is then open, to a blow-off line 27 that allows displaced argon out into the atmosphere through a stop valve 26 which is then open. A concentration measuring device 33, which is parallel to this stop valve 26, determines when a respectively proceeding exchange of gases is complete. The gas dryer 3 has a known construction with a blower, a heating system and a gas-dryer vessel, and is therefore not explained in more detail.

Argon, which is stored in gas form in an inert-gas storage device 11 formed by cylinders 10, is used as the inert gas. A supply that is still present can easily be determined through the use of a pressure measuring device 34 in conjunction with the volume of the cylinders 10. This inert gas is supplied to the generator 1 through an inert-gas line 12, in a manner which is to be explained below. The coolant is fed into the feedline 6 from the cylinders 5, through a cooling-gas line 15 which has a pressure reducer 13 and a stop valve 14. A connecting line 18, which is governed by a stop valve 17, is disposed between the feedline 6 and the flushing line 9. The stop valve 19 is disposed in the flushing line 9 between the stop valve 17 and the distributor pipe 8. The inert-gas line 12 is connected to the flushing line 9 and the distributor pipe 8 and has a stop valve 24 and an excess pressure valve 16 with a blow-off connection piece 25.

The blow-off line 27, which is governed by the further stop valve 26, is connected to the connecting line 18 and the flushing line 9 through the stop valves 17 and 19, respectively. As a further part of the gas supply unit, compressed air can be fed into the feedline 6 through a compressed-air line 30 which contains an air filter and water separator 28 and a further stop valve 29. All of the above-mentioned stop valves 14, 17, 19, 24, 26 and 29 may be manually operable, but in the preferred exemplary embodiment they are constructed as solenoid valves which can be controlled, through control lines 32, from a central process control unit 31.

In normal operation, i.e. under load, the generator 1 is filled with pressurized $H_2$ and the stop valves 17, 24, 26 and 29 are closed, while the stop valve 19 is open, so that a small amount of gas is always flowing through the concentration measuring device 33. Losses of cooling gas are compensated for by the cooling-gas supply system 2. In order to initiate the inerting process, a manually triggered command signal M and/or an automatically triggered command signal A, is fed to the process control unit 31. First of all, the stop valves 17, 19 and 26 are opened in a preprogrammed sequence, so that the cooling gas being vented can escape into the atmosphere through the blow-off device 27. After venting the cooling gas, the stop valve 19 is closed. The stop valve 24 is then actuated in the opening direction, as a result of which pressurized argon passes out of the inert-gas storage device 11, through the inert-gas line 12 and the flushing line 9, to the lower distributor pipe 8, displacing the cooling gas. The above-described method is quick and favorable in terms of power consumption. If, for example due to an emergency, e.g. a fire, the command signal A is triggered by a fire alarm, the $H_2$ filling the generator can be quickly and directly removed through the use of the sequence in accordance with the method, without a phase transition of the inert gas. This may prevent more extensive damage. If the generator 1 is to be made accessible for maintenance, the inert gas filling the generator is displaced by removing compressed air from a compressed-air network through the compressed-air line 30 and the feedline 6, in such a way that it is blown off through the flushing line 9, the stop valve 19, the blow-off line 27 and the stop valve 26. The concentration of inert gas in cooling gas and of inert gas in air can be monitored in both flushing operations through the use of the concentration measuring device 33 which is in continuous operation and interacts with the process control unit 31. Introduction of the compressed air is thus likewise carried out in an automated manner by controlling the stop valve 29 and the further above-described stop valves.

If, after the completion of the maintenance involving access, the generator is to be restored to normal operation, the above-described method steps are run through in reverse order. Firstly, therefore, the air is displaced by flushing with argon, in order to avoid an explosive hydrogen-air mixture, then argon is flushed out using $H_2$. In order to do this, first of all argon is supplied through the flushing line 9 in order to displace the air, which then escapes through the feedline 6 and the blow-off line 27. The step described at the start is then carried out in order to fill the generator with cooling gas.

Figure 2:
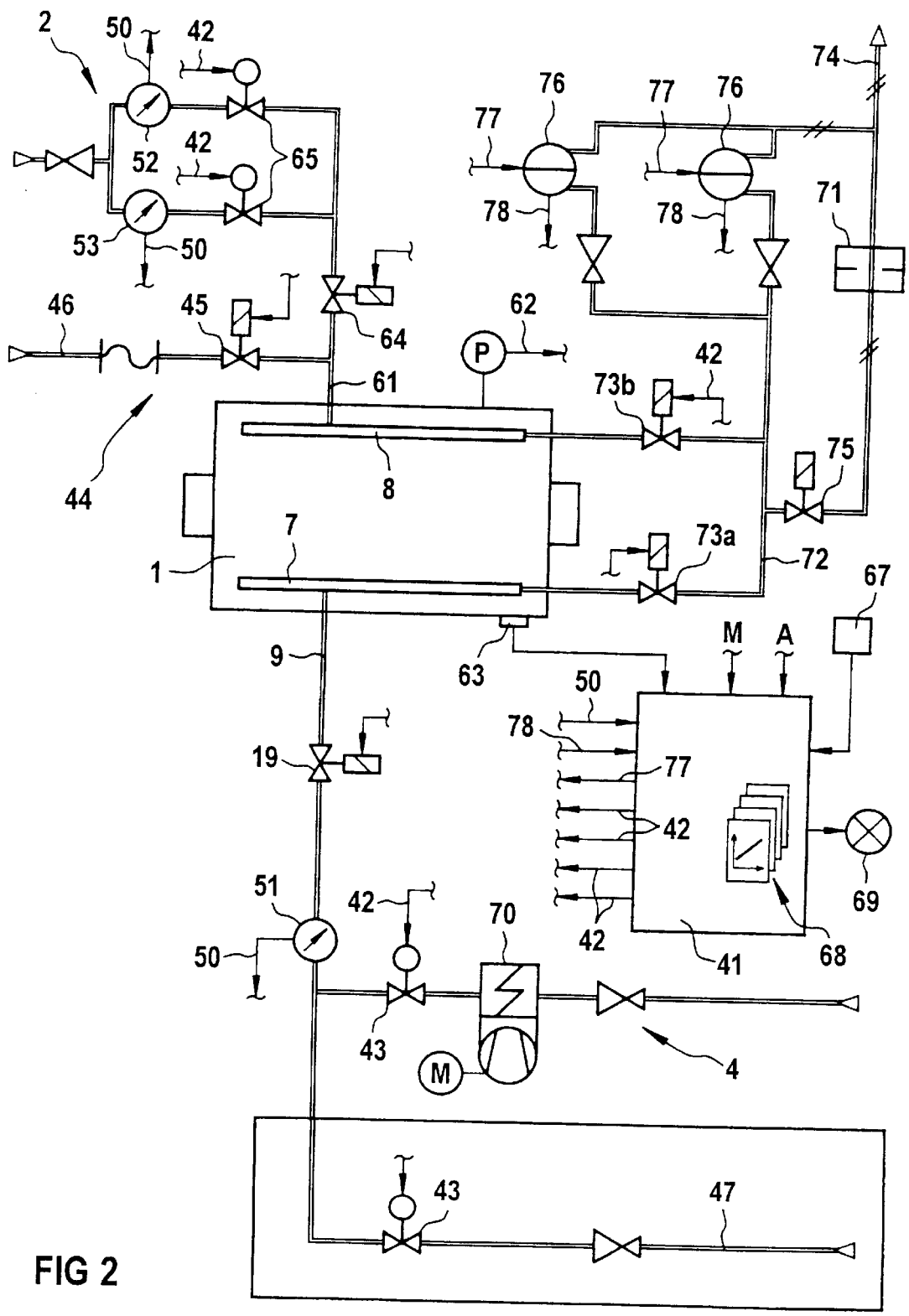

FIG. 2 depicts a hydrogen-cooled generator 1 of a power station with a gas supply unit which has a cooling-gas supply system 2 that provides the hydrogen ($H_2$) as cooling gas, a compressed-air supply system 44 and an inert-gas supply system 4 which provides argon or carbon dioxide ($CO_2$) as the inert gas.

The gas supply unit furthermore has a plurality of valve devices, which are to be explained below and are constructed as controllable, electrically actuated solenoid valves or as control valves having the same characteristics. The operation of the generator 1 is carried out or monitored from a non-illustrated control desk. This control desk is assigned a central process control unit 41, in which a filling partial control sequence or an emptying partial control sequence is activated as a function of manually or automatically triggered command signals M or A. The process control unit 41 is connected to the valve devices through signal lines 42.

The filling partial control sequence is explained first. It is assumed herein that the generator 1 is at a standstill and is filled with atmospheric air, for example due to the need to gain access for maintenance purposes. After triggering the manual command signal M, a control valve 43 disposed in the inert-gas supply system 4 is automatically actuated in the opening direction by the process control unit 41, and a solenoid valve 19 situated downstream of the control valve 43 in a feedline 9 (flushing line) is opened. Gaseous argon is supplied or liquid $CO_2$ is removed through the control valve 43 and is depressurized through an evaporator 70, from a supply unit which includes a group of cylinders and is assigned to the inert-gas supply unit 4. In order not to exceed the permissible capacity of the latter, a signal from a mass flowmeter 51 is superimposed on the control of the control valve 43. The feedline 9 opens into a lower distributor pipe 7 of the generator 1 and displaces air through a connecting line 72. An upper solenoid valve 73b which is disposed between an upper distributor pipe 8 and this connecting line 72 is open, and a further solenoid valve 75 disposed in a blow-off line 74 is open. A baffle 71 which is disposed in this blow-off line makes a small part of the displaced air also flow through two concentration measuring devices 76 which are disposed in parallel between the connecting line 72 and the blow-off line 74. These measuring devices can be switched over to one of three measurement ranges through signal lines 77, and in this flushing operation they can record the concentration of argon or $CO_2$ in air and transmit a first current concentration value KW1 to the process control unit 41 through signal lines 78. Predetermined, first desired concentration values KWS1 are stored in this process control unit and, upon reaching the values KWS1, the concentration measuring device 76 is switched over to a second measurement range measuring argon or $CO_2$ in $H_2$. The flushing operation described is terminated by closing the valves 43 and 19, and a further flushing operation for displacing argon or $CO_2$ through the use of $H_2$ is initiated by opening a solenoid valve 64 and one of two control valves 65 in a feedline 61 for cooling gas.

Hydrogen which is removed from a central storage device and fed in through the upper distributor pipe 8, displaces the inert gas. A second current concentration value KW2 is recorded in the manner already described above and this flushing operation is also terminated upon reaching a second predetermined desired concentration value KWS2.

The concentration measuring device 76 is then switched over to a third measurement range measuring $H_2$ in air and, after closing the solenoid valves 73*b* and 75, the generator 1 is filled with $H_2$ to its nominal pressure of about 3 to 6 bar superatmospheric pressure. A small quantity of cooling gas permanently flows through the concentration measuring devices 76 and through an open lower solenoid valve 73*a*. Maintenance of the predetermined pressure level is permanently monitored through the use of a pressure sensor 63 or 62 of the process control unit 41. The mass flowmeter 51 and further mass flowmeters 52, 53 for monitoring the quantities of gas that are actually flowing may also be present and are connected to the process control unit 41 through signal lines 50.

During the subsequent power-producing operation of the generator 1, a specific volumetric flow is continually forced out of a central $H_2$ storage device, through the feedline 61, into the generator 1, in order to replace the volume required for measuring the concentration and the volume of cooling gas being released through a sealing-oil vessel of the generator 1.

The emptying partial control sequence proceeds as follows. The emptying partial control sequence of the process control unit 41 is activated through the use of a manual command signal M or an automatic command signal A. The signal A is triggered when the pressure difference between cooling gas and sealing oil falls below a predetermined limit value or when, during a predeterminable period of time which is stored in the process control unit 41, the nominal pressure of the generator 1 falls by a specific amount, or the concentration of air in $H_2$ in the generator 1 exceeds a predetermined limit value 1, or an emergency alarm 67, which is constructed, for example, as a fire alarm, of the power station, indicates a fire. Irrespective of the automatic or manual triggering, first of all the generator power is checked and, in the event of the generator 1 being de-energized, the nominal pressure is relieved through the blow-off line 74. This is followed by two flushing operations, as in the filling partial control sequence, but in reverse order. After shutting off the valves 64 and 65, the inert gas is fed in through the valves 43 and 19, displacing the cooling gas. This flushing operation is again monitored and terminated through the use of detected concentration values KW3,4 and by comparison with predetermined desired concentration values KWS3,4. The inert gas is then flushed by removing air from the compressed-air supply unit 44 due to a solenoid valve 45 in a compressed-air line 46 being opened. An introduction of compressed air into the generator 1 is only made possible in this case through the use of a locking mechanism which is not shown and is actuated from the process control unit 41 if the level has fallen below a specific concentration value for $H_2$ in the generator 1.

Curves of the temporal progress of the flushing operations for both partial control sequences are stored in files 68 of the process control unit 41. These curves are continually correlated with the currently detected data. If, in the process, predetermined deviation values are reached or exceeded, either an alarm device 69 is actuated or the respective flushing operation is interrupted if argon is used instead of $CO_2$ as the inert gas. Argon can be removed directly from a supply unit including a group of cylinders, through a line 47, as is illustrated within a boxed area in FIG. 2, thus saving on the cost of the evaporator 70 and without a phase transition.

To summarize, filling and emptying operations with inerting can be carried out automatically without problems. During filling, the inerting is carried out with the displacement of air through the use of inert gas, in which case the upper solenoid valve 73*b* and the solenoid valve 75 in the blow-off line are opened, the lower solenoid valve 73*a* is closed, the solenoid valves 64 and 45 are closed, and the solenoid valve 19 is opened. The subsequent filling with the displacement of the inert gas through the use of $H_2$ gas is carried out by opening the lower solenoid valve 73*a* and the solenoid valve 75 in the blow-off line, closing the upper solenoid valve 73*b*, closing the solenoid valves 45 and 19 and opening the solenoid valve 64.

During normal operation of the generator 1, the lower solenoid valve 73*a* is open, the solenoid valve 75 in the blow-off line and the upper solenoid valve 73*b* are closed, the solenoid valves 45 and 19 are closed and the solenoid valve 64 is open.

When emptying, during inerting with displacement of the $H_2$ gas through the use of the inert gas, the upper solenoid valve 73*b* and the solenoid valve 75 in the blow-off line are open, the lower solenoid valve 73*a* is closed, the solenoid valves 64 and 45 are closed and the solenoid valve 19 is open. Flushing is then carried out with air, in which case, during the displacement of the inert gas through the use of air, the lower solenoid valve 73*a* and the solenoid valve 75 in the blow-off line are open, the upper solenoid valve 73*b* is closed, the solenoid valves 19 and 64 are closed and the solenoid valve 45 is open.

We claim:

1. In a power station having a generator cooled with a gaseous, pressurized coolant during normal operation, a method for inerting the generator, comprising:
   a) blowing off the coolant by venting; and
   b) flushing the generator by displacing the coolant in the generator with an inert gas stored in gaseous form and supplied directly to the generator for inerting the generator.

2. The method according to claim 1, which comprises using argon as the inert gas.

3. The method according to claim 1, which comprises carrying out the flushing step by activating at least one stop valve disposed between an inert-gas storage device and the generator.

4. The method according to claim 3, which comprises controlling at least one stop valve with a magnetic switch.

5. The method according to claim 3, which comprises closing the stop valve for step a) and opening the stop valve for step b).

6. The method according to claim 5, which comprises controlling at least one stop valve with a magnetic switch.

7. The method according to claim 5, which comprises storing the inert gas under pressure in the inert-gas storage device and feeding the inert gas into the generator by actuating the corresponding stop valve, when required.

8. The method according to claim 7, which comprises controlling at least one stop valve with a magnetic switch.

9. The method according to claim 7, which comprises providing a feedline associated with the generator, a flushing line for coolant, a first stop valve disposed between the feedline and the flushing line, and a second stop valve in the flushing line between the first stop valve and the generator.

10. The method according to claim 9, which comprises controlling at least one stop valve with a magnetic switch.

11. The method according to claim 9, which comprises individually connecting the feedline and the flushing line to a blow-off line.

12. The method according to claim 9, which comprises simultaneously connecting the feedline and the flushing line to a blow-off line.

13. The method according to claim 9, which comprises:

closing the first stop valve between the feedline and the flushing line and opening the second stop valve, in normal operation;

in step a) opening a third stop valve in a blow-off line connected to the flushing line, and opening the first and second stop valves, permitting the coolant to be vented through the feedline and the flushing line through the blow-off line; and in step b) flushing the generator by closing the second stop valve in the flushing line and feeding in the inert gas through an inert-gas line connected to the flushing line while displacing the coolant through the feedline connected to the blow-off line.

14. The method according to claim 13, which comprises controlling at least one stop valve with a magnetic switch.

15. The method according to claim 1, which comprises sending at least one of manually and automatically triggered command signals to a central process control unit for automated inerting of the generator and actuating solenoid valves in an opening or closing direction in a preprogrammed sequence.

16. The method according to claim 1, which comprises carrying out the inerting, during filling or emptying of the generator, using a gas supply unit associated with the generator and having at least one cooling-gas supply system, a compressed-air supply system, an inert-gas supply system and valve devices constructed as solenoid or control valves and associated with the systems, by activating a first partial control sequence "filling" or a second partial control sequence "emptying" of a central process control unit, automatically controlling the valve devices with the process control unit, actuating the valve devices, in accordance with a respectively activated partial control sequence, in a preprogrammed sequence for displacing the cooling gas contained in the generator with an inert gas introduced from the inert-gas supply system and then displacing the inert gas with air from the compressed-air supply system or cooling gas from the cooling-gas supply system, and terminating the activated partial control sequence after completion of the preprogrammed sequence.

17. The method according to claim 16, which comprises, after activation of the partial control sequence "filling", flushing the generator with the inert gas through an electrical control valve of the inert-gas supply system and, in a first measurement range, measuring the concentration of inert gas in air in the generator with a concentration measuring device associated with the generator and feeding the concentration of inert gas in air in the generator to the process control unit for terminating the flushing operation upon reaching a first predetermined desired concentration value.

18. The method according to claim 17, which comprises switching the concentration measuring device over to a second measurement range for measuring the concentration of inert gas in cooling gas with the process control unit after reaching the first concentration value, and continuing the filling operation through a further electrical control valve while flushing the inert gas with cooling gas until the flushing operation is terminated after reaching a second predetermined desired concentration value.

19. The method according to claim 16, which comprises, after activation of the partial control sequence "emptying", flushing the generator with the inert gas through an electrical control valve of the inert-gas supply system and, in a first measurement range, measuring the concentration of inert gas in the cooling gas with a concentration measuring device associated with the generator and feeding the concentration of inert gas in the cooling gas to the process control unit for terminating the flushing operation upon reaching a predetermined desired concentration value.

20. The method according to claim 19, which comprises switching the concentration measuring device over to a second measurement range with the process control unit after reaching the desired concentration value, for measuring the concentration of air in inert gas, and continuing the emptying operation through a further solenoid valve while flushing the inert gas with air until the flushing operation is terminated after reaching a predetermined desired concentration value.

21. The method according to claim 16, which comprises triggering an automatic command signal for emptying when at least one of the following criteria is fulfilled:

a) a pressure difference between cooling gas and sealing oil of the generator falls below a predetermined limit value;

b) a nominal pressure in the generator falls below a predetermined value during a period of time which can be preset;

c) a concentration of cooling gas in air in the generator falls below a natural concentration of the cooling gas in atmospheric air;

d) a fire alarm associated with the power station signals an emergency.

22. The method according to claim 16, which comprises storing temporal curves of at least one of filling and emptying operations in the process control unit, comparing the temporal curves with current filling or emptying operations, and actuating an alarm device or closing a currently actuated valve device in the event of a deviation by a predeterminable value.

23. The method according to claim 16, which comprises supplying additional measured values from measurement sensors to the process control unit through signal lines, and comparing a temporal progress of the additional measured values with desired values in order to detect and indicate errors.

24. The method according to claim 23, which comprises supplying the additional measured values from at least one of flowmeters and pressure sensors as the measurement sensors.

25. The method according to claim 1, which comprises using hydrogen as the pressurized coolant.

* * * * *